US012515366B2

(12) United States Patent
Lair et al.

(10) Patent No.: US 12,515,366 B2
(45) Date of Patent: Jan. 6, 2026

(54) POSITIONING DEVICE AND POSITIONING ASSEMBLY FOR HOLDING A FLAT FLEXIBLE PART, AND SHEET MATERIAL PROCESSING MACHINE

(71) Applicant: BOBST MEX SA, Mex (CH)

(72) Inventors: Tim Lair, Bussigny (CH); Jade Sternberg, Zürich (CH); Amel Neumann, Cheseaux (CH)

(73) Assignee: BOBST MEX SA, Mex (CH)

( * ) Notice: Subject to any disclaimer, the term of this patent is extended or adjusted under 35 U.S.C. 154(b) by 309 days.

(21) Appl. No.: 18/255,165

(22) PCT Filed: Dec. 8, 2021

(86) PCT No.: PCT/EP2021/084748

§ 371 (c)(1),
(2) Date: May 31, 2023

(87) PCT Pub. No.: WO2022/122805

PCT Pub. Date: Jun. 16, 2022

(65) Prior Publication Data

US 2024/0001577 A1 Jan. 4, 2024

(30) Foreign Application Priority Data

Dec. 10, 2020 (EP) .................................... 20213099

(51) Int. Cl.

| | |
|---|---|
| ***B26D 7/01*** | (2006.01) |
| ***B33Y 80/00*** | (2015.01) |
| ***B65H 9/08*** | (2006.01) |

(52) U.S. Cl.

CPC .............. *B26D 7/018* (2013.01); *B33Y 80/00* (2014.12); *B65H 9/08* (2013.01); *B65H 2801/42* (2013.01)

(58) Field of Classification Search

CPC .......... B65H 3/12; B65H 3/122; B65H 3/124; B65H 9/08; B26D 7/018

(Continued)

(56) References Cited

U.S. PATENT DOCUMENTS 3,972,523 A * 8/1976 Brandes ............... B65H 29/686 271/183
4,184,292 A * 1/1980 DeFazio ............... B24B 13/005 269/21

(Continued)

FOREIGN PATENT DOCUMENTS

CN 109121409 A 1/2019
JP S60155800 A 8/1985

(Continued)

*Primary Examiner* — Christopher M Koehler

(74) *Attorney, Agent, or Firm* — Bookoff McAndrews, PLLC

(57) ABSTRACT

A positioning device (38) for holding a flat flexible part, especially a sheet, on a positioning surface is described. It comprises a body (44) with a fluid inlet port (52) for supplying a driver fluid to the body (44), a fluid outlet port (58) for draining the driver fluid from the body (44), and a suction opening for aspiring the flat flexible part. A circulation channel (60) connects the fluid inlet port (52) and the fluid outlet port (58) and a suction channel (70) connects the suction opening to the circulation channel (60). The suction channel (70) is connected to the circulation channel (60) adjacent to a section (64) of reduced cross section area such that a jet pump (71) is formed. Every cross section ($S_c$) of the circulation channel (60) and/or every cross section ($S_s$) of the suction channel (70) along its entire respective length have/has a smooth rim. Additionally, a positioning assembly comprising at least one such positioning device (38) is presented. Moreover, a sheet material processing machine is introduced which comprises at least one positioning assembly.

13 Claims, 5 Drawing Sheets

Figure 1:
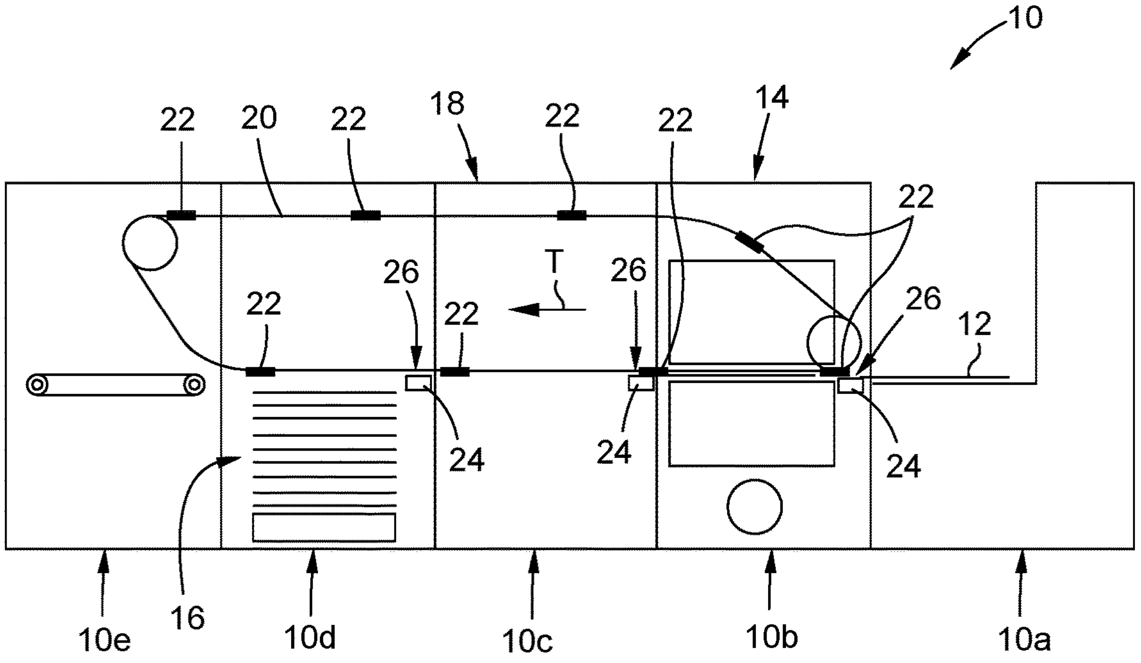

(58) Field of Classification Search
USPC ................................ 269/21; 29/743, DIG. 44
See application file for complete search history.

(56) References Cited

U.S. PATENT DOCUMENTS

| | | | | |
|---|---|---|---|---|
| 5,979,889 | A * | 11/1999 | Klopfenstein | B65H 3/0875 271/106 |
| 2003/0141673 | A1 * | 7/2003 | Olgado | H01L 21/6838 269/21 |
| 2006/0157905 | A1 * | 7/2006 | Lenzini | B25B 11/005 269/21 |
| 2008/0232876 | A1 | 9/2008 | Chen et al. | |
| 2013/0269817 | A1 | 10/2013 | Okihara et al. | |
| 2015/0102554 | A1 * | 4/2015 | Ansermot | B65H 7/02 15/345 |
| 2018/0222707 | A1 * | 8/2018 | Chatry | B65H 29/686 |
| 2018/0274831 | A1 | 9/2018 | Iancu et al. | |
| 2024/0383708 | A1 * | 11/2024 | Phan | B65H 1/04 |

FOREIGN PATENT DOCUMENTS

| | | | |
|---|---|---|---|
| JP | H06222065 | A | 8/1994 |
| JP | 3125920 | U | 9/2006 |
| JP | 2013512120 | A | 4/2013 |
| KR | 1020200016175 | A | 2/2020 |
| TW | I325406 | B | 6/2010 |
| WO | 2011064226 | A1 | 6/2011 |
| WO | 2014067611 | A1 | 5/2014 |
| WO | 2017137170 | A1 | 8/2017 |

* cited by examiner

POSITIONING DEVICE AND POSITIONING ASSEMBLY FOR HOLDING A FLAT FLEXIBLE PART, AND SHEET MATERIAL PROCESSING MACHINE

CROSS-REFERENCE TO RELATED APPLICATION(S)

This application is a National Stage Application under 35 U.S.C. § 371 of International Application No. PCT/EP2021/084748, filed on Dec. 8, 2021, which claims priority to European Application No. 20213099.3, filed on Dec. 10, 2020, the entireties of which are incorporated herein by reference.

The invention relates to a positioning device for holding a flat flexible part, especially a sheet, on a positioning surface. The positioning device comprises a body with a fluid inlet port for supplying a driver fluid to the body, a fluid outlet port for draining the driver fluid from the body, and a suction opening for aspiring the flat flexible part. The suction opening is arranged within the positioning surface being an outer surface of the body. Furthermore, a circulation channel connects the fluid inlet port and the fluid outlet port, wherein the circulation channel comprises a section of reduced cross section area. A suction channel connects the suction opening to the circulation channel, wherein the suction channel is connected to the circulation channel adjacent to the section of the reduced cross section area such that a jet pump is formed. In this context, the term "hold" is also understood to mean a decelerating of the sheet material and a subsequent holding.

The invention is also directed to a positioning assembly for holding a flat flexible part, especially a sheet, on a holding surface, comprising a base part with a central air supply duct and at least one positioning device of the type mentioned above. The positioning device is mounted on the base part such that the air inlet port of the positioning device is fluidically connected to the central air supply duct and that the positioning surface forms the holding surface.

Furthermore, the invention relates to a sheet material processing machine comprising at least one such positioning assembly.

Sheet material processing machines, positioning assemblies and positioning devices of the types mentioned above are known in the art. Sometimes the positioning devices are also called tablets.

Sheet material processing machines, such as paper or cardboard processing machines, often comprise a plurality of processing units or stations, wherein in each of the processing units or stations a certain type of treatment is performed on the sheet material, e.g. it is cut, stripped or blanked. Usually, a conveyor system is provided within such a machine in order to transfer the sheet material from one processing unit to the next.

In order to perform the corresponding treatment in a precise and reliable manner, each of the processing units may comprise a positioning assembly of the type mentioned above. The positioning assembly may comprise at least one positioning device of the type mentioned above. The positioning of the sheet material performed by the positioning assembly and the positioning device may be static or dynamic, i.e. the sheet material may be stationary or move while being held against the positioning surface. In the first case, the positioning device may also be designated a holding device. In the second case it may be used for decelerating the sheet material as a so-called suction brake.

When the positioning device is used as a suction brake, it decelerates the sheet material from the maximal feeding speed on arriving at a workstation, whereby it is known practice to brake its rear portion to maintain a certain degree of flatness of the sheet material during the sheet introduction phase by using a suction bed which may be referred to as a suction braking device or suction brake. Installed transversely in close proximity to the entry to the workstation, such a braking device performs its function by restraining the rear portion of the sheet using suction, while at the same time allowing it progressively to slide as its front portion is pulled forward. In particular, when a sheet arrives at a workstation for processing, the gripper bar that is pulling the front edge of the sheet stops to enable the sheet to be processed. The suction brake is used to generate friction between the sheet and a stationary surface, thereby providing a braking effect on the trailing parts of the sheet, so that the inertia of the sheet does not cause the sheet to buckle, crumple or crease.

In operation, a suction brake first sucks out the air between the sheet and an operating surface of the braking device, and then, by pulling the sheet against the operating surface of the device, applies a restraining force to the sheet that serves as a braking force. Ideally the first operation of sucking out the air between the sheet and the operating surface of the braking device is achieved as quickly as possible so as to avoid sheet deformation as the result of sheet inertia. This requires maximum suction.

In the second stage of operation, the sheet is sucked to the operating surface of the braking device, blocking the suction apertures, and the air flow through the suction apertures drops to zero. The sheet is still decelerating at this stage, and the braking force applied has to be high enough to be able to brake the sheet effectively, avoiding the formation of ripples in the sheet and keeping the sheet flat. Optimal performance, and in particular avoiding sheet distortion, requires the amount of suction at this second stage to be adjusted based on the type of sheet (e.g. the material type of the sheet, and its weight) as well as the cutting shape of the sheet. This means that the pressure and/or volume of gas that is causing the suction needs to be adjusted based on the requirements of this second stage of operation—even though that may conflict with the requirements of the first stage. Applying too high a braking force at this stage of the operation may cause machine interruptions, damage to packaging blanks, etc.

In all cases the sheet material to be processed spans between the positioning assembly with the at least one positioning device and a gripper unit of the conveyor system. The sheet material is held on the positioning surface such that it is precisely positioned within the machine. The sheet material is held on the corresponding positioning device by a suction force being generated by the jet pump formed by the circulation channel and the suction channel connected thereto. With respect to the suction opening, the jet pump is operating as an aspirator.

As is generally known, the suction force is dependent on an acceleration of the fluid which is present in the suction channel. This fluid is accelerated by the driver fluid flowing through the circulation channel. Higher suction forces require a higher acceleration of the fluid in the suction channel. This can be achieved by providing the driver fluid at an elevated pressure. In summary, high suction forces require an elevated level of power or energy in the provision of the driver fluid.

WO 2011/064226 A1 shows a device for processing a sheet-like print substrate comprising a sheet support surface and a fluid flow generator for inducing a fluid flow through a Venturi-type under pressure source. The Venturi-type under pressure source comprises a first passage extending from an inlet to an outlet and a second passage connecting the first passage with a suction endpoint. The connection between the first passage and second passage is located adjacent to a diametrical flow restriction within the first passage.

Further, US 2013/269817A1 discloses a pump suction pipe for a pumping station comprising a suction pipe outlet portion, a suction pipe inlet portion, and a suction pipe bent portion that connects the suction pipe outlet portion and the suction pipe inlet portion to each other and changes a flow from the lateral direction to the vertical direction. Thereby the vertical cross section of the suction pipe bent portion is monotonically increased from an upstream side to a downstream side.

Moreover, US 2018/274831 A1 discloses a refrigerant compressor with a suction line. The suction line includes a geometry with a constantly decreasing cross sectional area in a direction towards the compressor. This geometry of the suction line is configured to decrease the amount of swirl, the amount of pressure loss, and provide more uniform flow of refrigerant into compressor.

WO 2017/137170 A1 shows a device for loading insert sheets, with longitudinal bars fixed on a cross member so that the longitudinal bars form a positioning surface. The longitudinal bars comprise a suction duct with at least one suction orifice on the positioning surface. The suction duct is configured to be connected to a vacuum source. Further transverse duct is formed in the cross member and opens at a lateral end of the cross member to which the vacuum source can be connected.

Furthermore, WO 2014/067611 A1 shows a further device for holding sheet-like flat elements comprising two series of suction members that are each composed of a plurality of suction members. Both the two series of suction members and the plurality of suction members are arranged in a special way among themselves and to each other.

It is an objective of the present invention to improve known sheet material processing machines, positioning assemblies and positioning devices with respect to their energy efficiency. This means that a given level of suction force shall be attained with a comparatively low amount of power or energy in the provision of the driver fluid.

The problem is solved by a positioning device of the type mentioned above, wherein every cross section of the circulation channel and/or every cross section of the suction channel along its entire respective length have/has a smooth rim. In this context, the cross section is substantially perpendicular to an axis of the circulation channel or the suction channel respectively, wherein the axis is a local axis since the circulation channel and/or the suction channel may comprise bends or curves. The rim is to be understood as an outer contour of the cross section. The rim is always a closed geometry. Since the rim is smooth, it does not comprise corners or kinks but may have substantially straight segments. Mathematically speaking this means that a first differential of the rim is continuous. Moreover, the rim may be convex or comprise concave and convex segments. Thus, in the first alternative a radius of curvature of the rim does not change its direction or sign. In the second alternative the radius of curvature changes its direction or sign at least twice. In particular, the rim has the shape of a circle, an ellipse or an oval. Consequently, undesired pressure losses along the course of the circulation channel and/or the suction channel are significantly reduced. Consequently, compared to known positioning devices, less power or energy is necessary for maintaining a given level of suction force provided at the suction opening. Alternatively, using a given level of power or energy, an increased level of suction force may be provided. This is due to the fact that a smooth cross section reduces the friction of to fluid flow within these channels. It is noted that within the section of reduced cross section area, more precisely, downstream the section of reduced cross section area a pressure drop is desired and necessary for the functionality of the jet pump. In summary, the energy efficiency of the positioning device is increased.

In its operational state, the positioning surface may be a top surface. The inlet port may be located on s lower surface of the positioning device and the outlet port on a side surface thereof.

According to an embodiment a course of the cross section of the circulation channel along the length of the circulation channel comprises one single discontinuity. This means that along the circulation channel its cross section changes only once in an abrupt, step-wise manner. Beyond that, the cross section may of course change in a continuous manner. Preferably, the single discontinuity is located at a downstream end of the section of reduced cross section area. In particular, the circulation channel merges into the circulation channel adjacent to the discontinuity. Thus, upstream and downstream of the single discontinuity the circulation channel is designed such that comparatively low pressure losses occur when a fluid flows through the circulation channel. This further increases the energy efficiency of the positioning device.

In a variant, a cross section of the suction channel evolves continuously along the entire length of the suction channel. Thus, the suction channel does not have any discontinuity. As a consequence thereof, also the suction channel is designed such that comparatively low pressure losses occur when a fluid flows there through.

In particular, a direction of extension of the circulation channel evolves continuously along the entire length of the circulation channel. Additionally or alternatively a direction of extension of the suction channel evolves continuously along the entire length of the suction channel. This means that the circulation channel and/or the suction channel do/does not comprise abrupt changes in direction, but smooth ones. Also this design leads to comparatively low pressure losses for a fluid flowing through the respective channel.

The circulation channel may comprise a bend, especially a bend of approximately 180 degrees. Such a circulation channel may be described as hairpin-shaped. Consequently, the circulation channel may be positioned in confined spaces. A corresponding positioning devices is compact.

The circulation channel may additionally comprise a bend of approximately 90 degrees. This bend may be located adjacent to the inlet port. Such a bend facilitates the arrangement of the inlet port such that it can be easily connected to a fluid supply.

According to an alternative, the fluid inlet port and the fluid outlet port are arranged on the same end of the body. They may be arranged on the same surface of the body, but this is not necessarily the case. According to an example, the inlet port may be arranged on a lower surface and the outlet port may be arranged on a side surface of the body. Especially in combination with a hairpin-shaped circulation channel this leads to a compact design of the positioning device.

Preferably, a curvature radius of a wall laterally delimiting the circulation channel lies within the range of 0.2 mm to 30 mm, in particular of 0.5 mm to 20 mm. Such channels are especially smooth. Consequently, friction of a fluid flowing through the circulation channel is reduced such that only comparatively low pressure losses occur.

It is possible that at least 60%, preferably at least 75%, more preferably at least 90%, of the length of the circulation channel have a cross section area being at least twice as big as the cross section areas of the remaining portions of the length of the circulation channel. Preferably, the remaining portions comprise the section of reduced cross section area. As has been explained before, the section of reduced cross section area is necessary for forming the jet pump. Thus, put in other words, the cross section area is kept as big as possible for as long as possible. This reduces the friction losses occurring in the circulation channel. In a preferred example, approximately 87% of the length of the circulation channel have a cross section area being at least twice as big as the cross section areas of the remaining portions of the length. In this example, the bigger cross section area is approximately 30 $mm^2$.

A cleaning fluid inlet port may be arranged on the body. Through this port a cleaning fluid, e.g. pressurized air, may be provided to the body for cleaning at least portions of the circulation channel and/or the suction channel. By keeping the circulation channel and/or the suction channel clean, the positioning device may be operated in a reliable manner over a long period of time.

A cleaning fluid channel may fluidically connect the cleaning fluid inlet port to the circulation channel or to the suction channel, wherein a cross section of the cleaning fluid channel has a smooth rim along its entire length. Consequently, also the cleaning fluid channel is designed such that comparatively low losses occur when a cleaning fluid flows there through. Thus, high energy efficiency is also achieved for a cleaning process.

According to an embodiment, the body is an additively manufactured part. In other words, the body is manufactured by an additive manufacturing technique, e.g. a 3D printing technique. Such manufacturing techniques imply only very few design restrictions on the manufactured part, i.e. the body. Consequently, especially the suction channel and the circulation channel may be designed without having to respect limitations of conventional manufacturing techniques. Thus, especially a suction channel and a circulation channel having the features as described above can be manufactured with comparatively low effort.

The body may be specifically designed for being manufactured by an additive manufacturing technique. The body preferably comprises wall segments especially forming the outer surfaces thereof. Within the wall segments, channel segments forming the suction channel and/or the circulation channel may be formed. Additionally, the body may comprise support segments. The wall segments, the channel segments and the support segments may all have a substantially equal wall thickness. Alternatively, the differences in thickness may only vary within a corridor of +/−20% with respect to each other.

The section of reduced cross section area of the circulation channel may comprise a nozzle having a substantially circular cross section. The nozzle forms part of the jet pump and is used for accelerating the fluid in the suction channel. In an idealized positioning device, a pressure drop only occurs in the nozzle. The remaining parts of the circulation channel are loss-free.

The problem is additionally solved by a positioning assembly of the type mentioned above comprising at least one positioning device according to the invention. Due to the reasons that have already been explained in connection with the positioning device, this positioning assembly can be operated in an energy efficient manner.

Moreover, the number and/or the dimensions of the positioning devices may be chosen such that combinations of different numbers of positioning devices or positioning devices of different dimensions result in a desired width of the positioning assembly. This width can be chosen such that it corresponds to common widths of sheet material processing machines. In other words, the positioning assembly is modular as far as the positioning devices are concerned. Consequently, it can be easily adapted to different kinds of sheet material processing machines.

Beyond that, all effects and advantages which have been explained in connection with the positioning device also apply to the positioning assembly and vice versa.

Furthermore, the problem is solved by a sheet material processing machine of the type mentioned above, comprising at least one positioning assembly according to the invention. Since the positioning assembly may be operated in a very energy efficient manner, the same is true for the sheet material processing machine equipped therewith.

Beyond that, all effects and advantages which have been explained in connection with the positioning device and the positioning assembly also apply to the sheet material processing machine and vice versa.

The invention will now be explained with reference to an embodiment which is shown in the attached drawings. In the drawings, FIG. 1 shows a sheet material processing machine according to the invention comprising several positioning assemblies according to the invention which each have at least one positioning device according to the invention, FIG. 2 shows a portion of a positioning assembly of FIG. 1 having two positioning devices, in a partly assembled condition, FIG. 3 shows a sectional view in plane III of the positioning assembly of FIG. 2.

Figure 2:
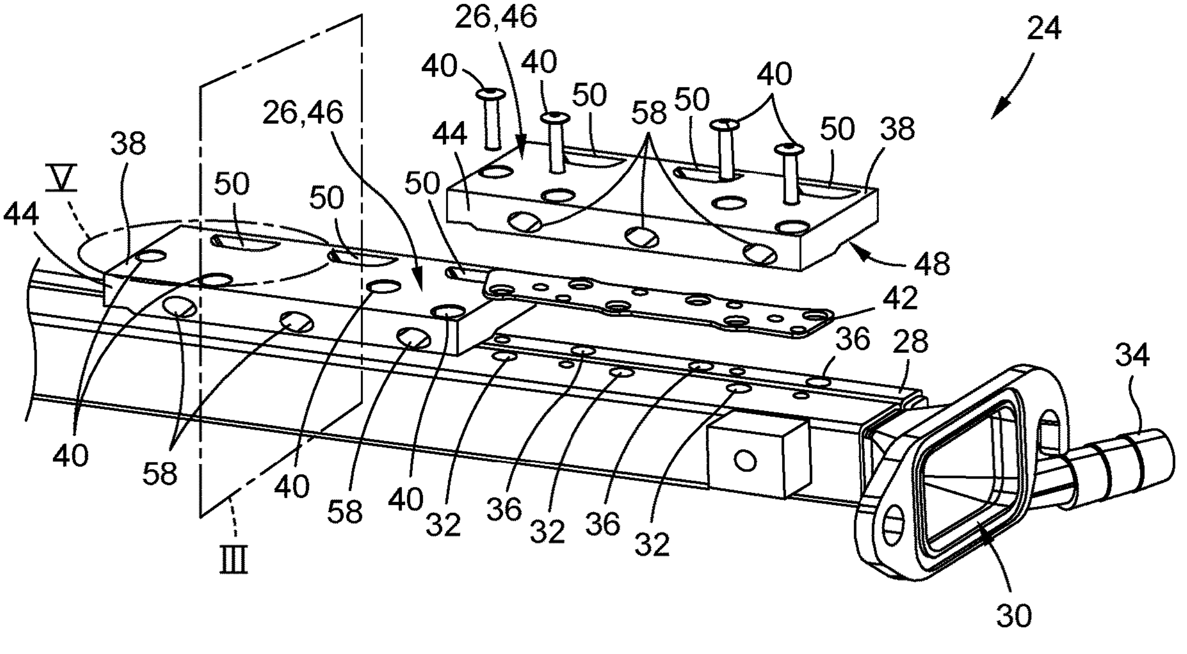
Figure 3:
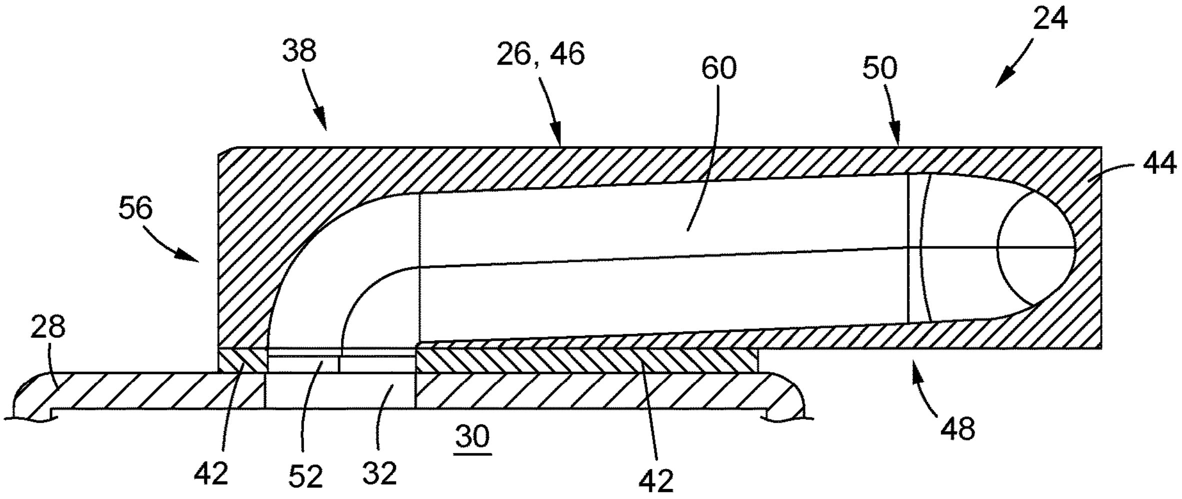
Figure 4:
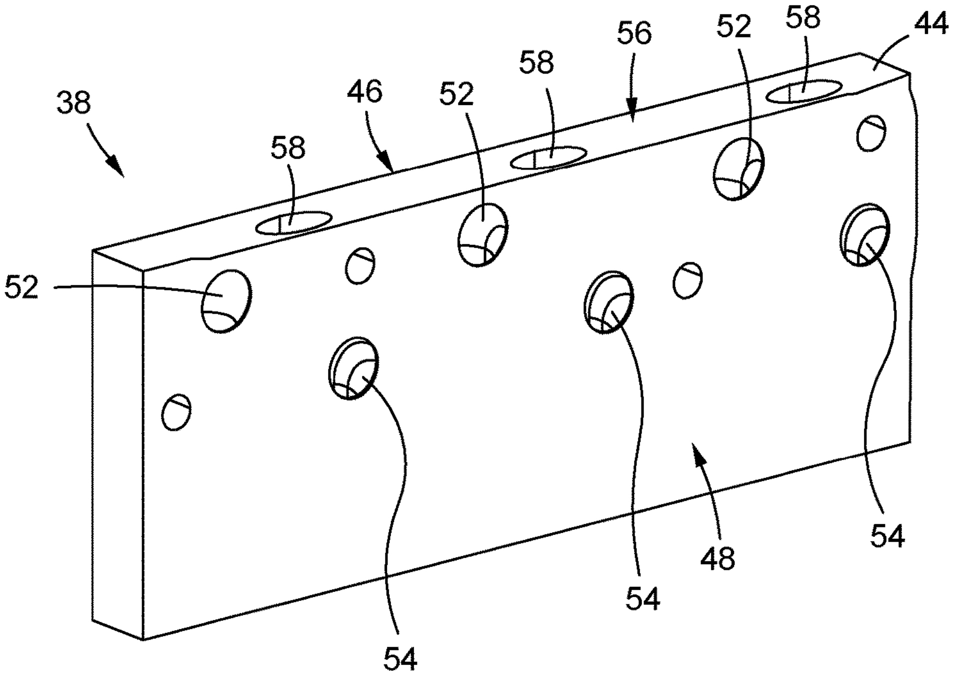
Figure 5:
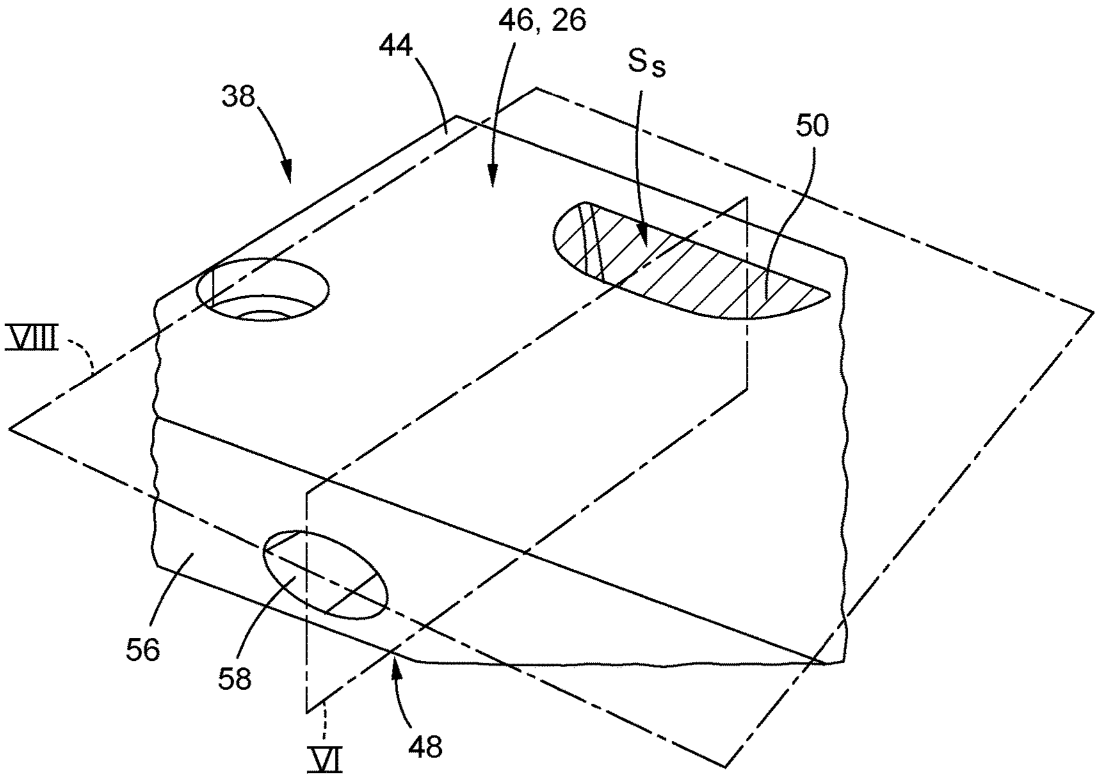
Figure 6:
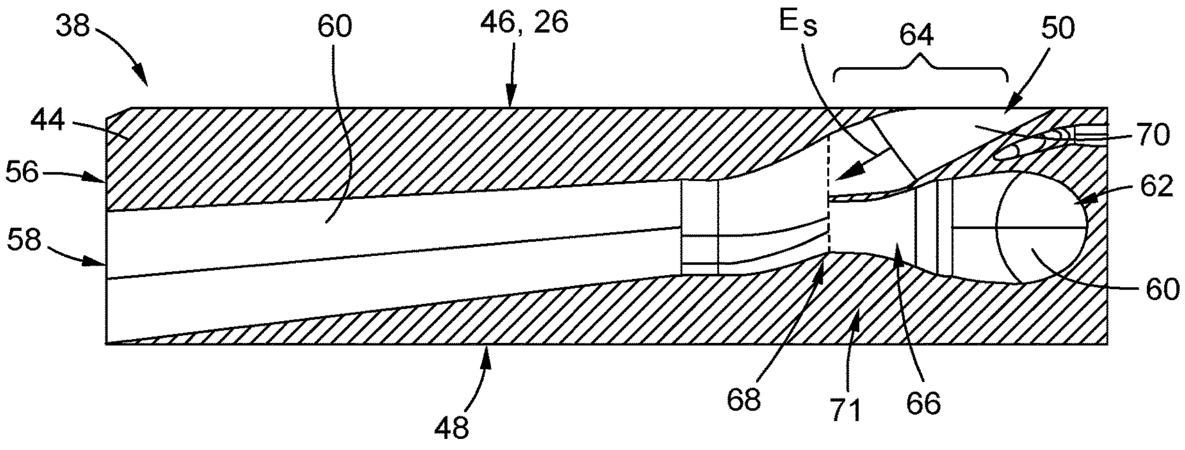
Figure 7:
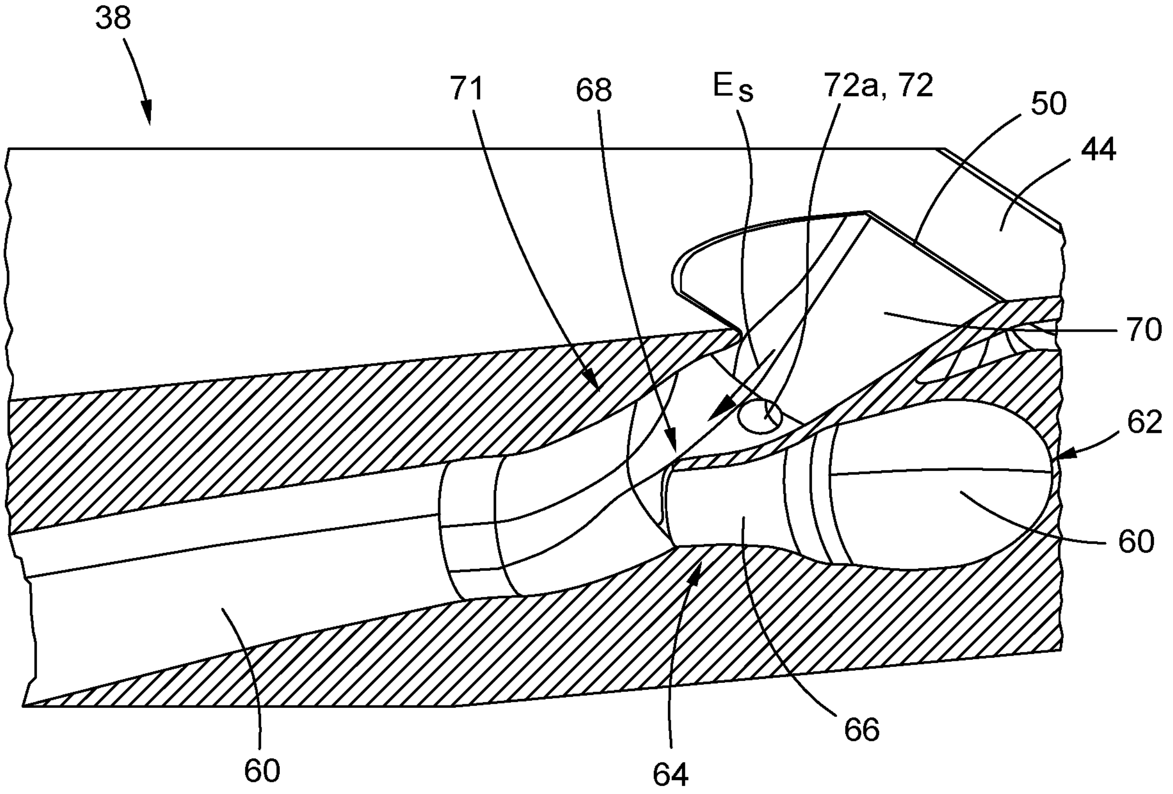
Figure 8:
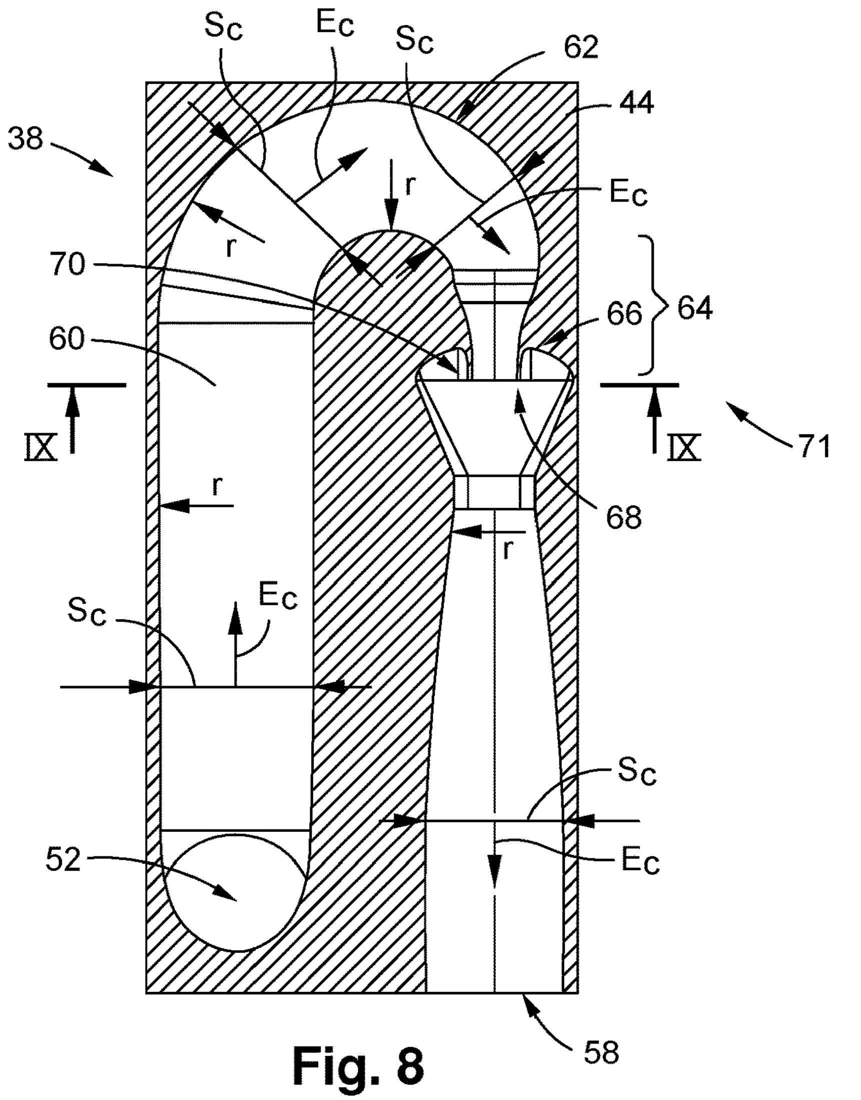
Figure 9:
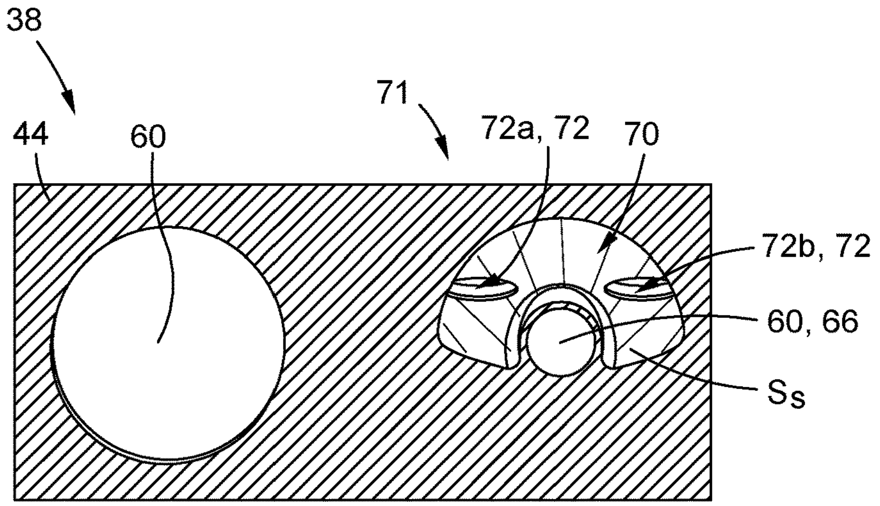

FIG. 4 shows a positioning device of FIGS. 1 and 2 in a perspective view, FIG. 5 shows a detail V of one of the positioning devices of FIG. 2, FIG. 6 shows a sectional view in plane VI of the positioning device of FIG. 5, FIG. 7 shows the portion of the positioning device of FIG. 5 comprising the sectional view of FIG. 6 in a perspective view, FIG. 8 shows a sectional view in plane VIII of the positioning device of FIG. 5, and FIG. 9 shows a sectional view in plane IX of the positioning device of FIG. 8.

FIG. 1 shows a sheet material processing machine 10 (in the following: machine 10).

In the example shown, the machine 10 is configured for cutting a sheet material and is composed of five units each performing a certain treatment on the sheet material.

A first unit is a feeder unit 10*a* for providing or feeding sheets 12 to be processed. For illustrative purposes, only one sheet 12 is represented in the feeder unit 10*a*.

The second unit comprises a platen press 14 which is configured for cutting the sheet 12. Consequently, the second unit is a platen press unit 10*b*.

The third unit is a stripping unit 10*c* which is configured for eliminating certain waste elements from the cut sheet 12.

The fourth unit is a blanking unit 10*d*. In this unit the actually desired portion of the cut sheet 12 is withdrawn therefrom and put on a pile 16.

The fifth unit is a waste evacuation unit 10*e* and serves for the elimination of further waste elements of the cut sheet 12.

The sheet 12 is transported through the machine 10 by a conveyor system 18 essentially comprising a conveyor belt 20 to which a plurality of gripper units 22 are attached, which are configured for selectively gripping the sheet 12.

The platen press unit 10*b*, the stripping unit 10*c* and the blanking unit 10*d* additionally comprise a positioning assembly 24 for holding the sheet 12, on a holding surface 26.

In the example shown in FIG. 1, the holding surface 26 is a top surface of the positioning assembly 24.

During the processing of the sheet 12 in any one of the platen press unit 10*b*, the stripping unit 10*c* and the blanking unit 10*d*, a leading edge of the sheet 12 will be gripped by a corresponding gripping unit 22 and a trailing edge of the sheet 12 will be held by the corresponding positioning assembly 24 (cf. travelling direction T).

FIG. 2 shows the positioning assembly 24 in more detail.

It comprises a base part 28 with a central air supply duct 30.

Thus, pressurized air can be supplied to the base part 28 via the central air supply duct 30.

The base part 28 also comprises a plurality of fluid outlet ports 32 which are in fluid communication with the central air supply duct 30.

Moreover, the base part 28 comprises a cleaning fluid inlet port 34. Thus, a cleaning fluid may be supplied to the positioning assembly 24 via the cleaning fluid inlet port 34.

The base part 28 additionally comprises cleaning fluid outlet ports 36 being in fluid communication with cleaning fluid inlet port 34.

In the example shown in FIG. 2, two positioning devices 38 are mounted on the base part 28 via fastening means 40, e.g. bolts or rivets.

A gasket 42 is interposed between the base part 28 and each of the positioning devices 38.

One of the positioning devices 38 will be explained in more detail with reference to FIGS. 3 to 9. Since the two positioning devices 38 shown in FIG. 2 are substantially identical, the following explanations apply to both of them.

The positioning device 38 comprises a body 44 being an additively manufactured part.

One outer surface of the body 44 is a positioning surface 46.

The positioning surface 46 forms a portion of the holding surface 26.

In the representation of FIG. 2 the positioning surface 46 is the top surface of the body 44.

The body 44 also comprises a connection surface 48 also being an outer surface thereof.

The connection surface 48 is arranged opposite the positioning surface 46 and thus is a lower surface of the body 44 in the representation of FIG. 2.

On the positioning surface 46 suction openings 50 are provided. These suction openings 50 are configured for aspiring the sheet 12 such that it is held on the positioning surface 46.

On the connection surface 48 fluid inlet ports 52 are provided for supplying a driver fluid to the body 44 (cf. FIGS. 3 and 4).

Additionally, cleaning fluid inlet ports 54 are arranged on the connection surface 48 (cf. FIG. 4).

The body 44 also has a lateral surface 56 which connects the positioning surface 46 and the connection surface 48.

On the lateral surface 56 fluid outlet ports 58 are provided for draining the driver fluid from the body 44 (cf. FIGS. 4 and 5).

The fluid inlet ports 52 and the fluid outlet port 58 are arranged on the same end of the body 44. In the representation of FIG. 4 they are provided on an upper end thereof.

Each of the fluid inlet ports 52 is connected to a corresponding fluid outlet port 58 by a circulation channel 60. In other words, the circulation channel 60 extends from the respective fluid inlet port 52 to the respective fluid outlet port 58 (cf. FIG. 8).

The circulation channel 60 is generally shaped like a hairpin, i.e. it comprises a bend 62 of approximately 180°.

Downstream the bend 62, the circulation channel comprises a section 64 of reduced cross section area.

The section 64 comprises a nozzle 66 for accelerating a flow of driver fluid flowing through the circulation channel 60.

The nozzle 66 has a substantially circular cross section (cf. FIG. 9).

When considering a cross section $S_c$ of the circulation channel 60 along its length, this cross section has a single discontinuity 68 at the downstream end of the nozzle 66.

In the remaining sections of the circulation channel 60 the cross section $S_c$ evolves continuously.

For the ease of representation only some of the cross sections $S_c$ of the circulation channel 60 are designated with a reference sign in FIG. 8.

In this context, approximately 87% of the length of the circulation channel 60 have a cross section area being at least twice as big as the cross section areas of the remaining portions of the length of the circulation channel 60.

This means that the circulation channel 60 has a relatively big and relatively uniform cross section area in all sections outside the section 64 of reduced cross section area.

Also a direction of extension $E_c$ of the circulation channel 60 evolves continuously along the entire length of the circulation channel 60, i.e. the circulation channel 60 has no corners or kinks.

Furthermore, every cross section $S_c$ of the circulation channel 60 along its entire length has a smooth rim, i.e. the contour delimiting the cross section $S_c$ also does not have corners or kinks.

In particular, a curvature radius r of a wall laterally delimiting the circulation channel 60 lies within the range of 0.5 mm to 20 mm.

For the ease of representation only some of the curvature radius r of the circulation channel 60 are designated with a reference sign in FIG. 8.

Within the body 44 also a suction channel 70 is provided which connects the suction opening 50 to the circulation channel 60.

The suction channel 70 surrounds the circulation channel 60 in the section 64 of reduced cross section area and is connected to the circulation channel 60 in the adjacent to the section 64 of reduced cross section area such that a jet pump 71 is formed.

More precisely, the suction channel 70 merges into the circulation channel 60 right at the position of the discontinuity 68.

Thus, a flow of driver fluid flowing through the circulation channel 60 is accelerated by the nozzle 66 and accelerates fluid being present in the suction channel 70 such that the sheet 12 is aspired via the suction opening 50.

A cross section $S_s$ of the suction channel 70 evolves continuously along the entire length of the suction channel 70. The course of the cross section $S_s$ of the suction channel 70 does not have discontinuities.

Again, only two representative cross sections $S_s$ are designated with a reference sign in FIGS. 5 and 9.

Also a direction of extension $E_s$ of the suction channel 70 evolves continuously along the entire length of the suction channel 70.

Moreover, like the circulation channel 60, also every cross section $S_s$ of the suction channel 70 along its entire respective length has a smooth rim.

It is noted that even though the suction openings 50 are generally D-shaped, a rim of a cross section the suction openings 50 and thus a rim of the cross section of the suction channel 70 does not comprise kinks or corners. This means that all corners of the D-shape are rounded.

Furthermore, a cleaning fluid channel 72 is provided which fluidically connects the cleaning fluid inlet port 54 to the suction channel 70 (cf. FIGS. 7 and 9).

In the example shown in the Figures, the cleaning fluid channel 72 is bifurcated at its downstream end such that a first cleaning fluid channel part 72*a* and a second cleaning fluid channel part 72*b* merge into the suction channel 70.

The cleaning fluid channel 72 has a cross section which has a smooth rim along its entire length.

It is understood that in the embodiments described in connection with the Figures, the sheet 12 is used as a representative example of a flat flexible part. This means that the machine 10, the positioning assembly 24 and the positioning device 38 can also be used in connection with any other flat flexible part.

The invention claimed is:

1. A positioning device for holding a flat flexible part on a positioning surface, the positioning device comprising:
   - a body with a fluid inlet port for supplying a driver fluid to the body, a fluid outlet port for draining the driver fluid from the body, and a suction opening for aspiring the flat flexible part, wherein the suction opening is arranged within the positioning surface being an outer surface of the body,
   - a circulation channel connecting the fluid inlet port and the fluid outlet port, wherein the circulation channel comprises a section of reduced cross section area, and
   - a suction channel connecting the suction opening to the circulation channel, wherein the suction channel is connected to the circulation channel adjacent to the section of reduced cross section area such that a jet pump is formed,
   - wherein every cross section of the circulation channel and/or every cross section of the suction channel along its entire respective length has a smooth rim, so that a contour delimiting every cross section of the circulation channel and/or every cross section of the suction channel along its entire respective length does not have corners or kinks, and
   - wherein the fluid inlet port and the fluid outlet port are arranged on a same end of the body.

2. The positioning device according to claim 1, wherein a course of the cross section of the circulation channel along the length of the circulation channel comprises one single discontinuity.

3. The positioning device according to claim 1, wherein a cross section of the suction channel evolves continuously along the entire length of the suction channel.

4. The positioning device according to claim 1, wherein a direction of extension of the circulation channel evolves continuously along the entire length of the circulation channel and/or in that a direction of extension of the suction channel evolves continuously along the entire length of the suction channel.

5. The positioning device according to claim 1, wherein the circulation channel comprises a bend.

6. The positioning device according to claim 1, wherein a curvature radius of a wall laterally delimiting the circulation channel lies within a range of 0.2 mm to 30 mm.

7. The positioning device according to claim 1, wherein at least 60% of the length of the circulation channel has a cross section area being at least twice as big as the cross section areas of remaining portions of the length of the circulation channel.

8. The positioning device according to claim 1, wherein a cleaning fluid inlet port is arranged on the body.

9. The positioning device according to claim 8, wherein a cleaning fluid channel fluidically connects the cleaning fluid inlet port to the circulation channel or to the suction channel, wherein a cross section of the cleaning fluid channel has a smooth rim along its entire length.

10. The positioning device according to claim 1, wherein the body is an additively manufactured part.

11. The positioning device according to claim 1, wherein the section of reduced cross section area of the circulation channel comprises a nozzle having a substantially circular cross section.

12. A positioning assembly for holding a flat flexible part on a holding surface, comprising a base part with a central air supply duct and at least one positioning device according to claim 1,
   - wherein the positioning device is mounted on the base part such that the fluid inlet port of the positioning device is fluidically connected to the central air supply duct and that the positioning surface forms the holding surface.

13. A sheet material processing machine comprising the positioning assembly of claim 12.

* * * * *